United States Patent [19]

Eiting

[11] Patent Number: 4,541,163
[45] Date of Patent: Sep. 17, 1985

[54] HUB STARTER FIXTURE

[75] Inventor: John C. Eiting, Minster, Ohio

[73] Assignee: Precision Strip Technology, Inc., Minster, Ohio

[21] Appl. No.: 603,165

[22] Filed: Apr. 23, 1984

[51] Int. Cl.⁴ .................................................. B23Q 3/00
[52] U.S. Cl. .................................... 29/426.5; 29/270; 29/464
[58] Field of Search ................... 29/426.4, 426.5, 244, 29/252, 270, 426.6, 466, 469, 464, 426.1; 403/12, 13, 14, 15, 19

[56] References Cited

U.S. PATENT DOCUMENTS

| | | | |
|---|---|---|---|
| 2,852,838 | 9/1958 | Krutmeijer | 29/252 |
| 4,434,883 | 3/1984 | Raines | 403/13 X |
| 4,472,869 | 9/1984 | Yasui et al. | 29/252 X |

FOREIGN PATENT DOCUMENTS

| | | | |
|---|---|---|---|
| 1574421 | 9/1980 | United Kingdom . | |
| 651932 | 3/1979 | U.S.S.R. | 29/252 |
| 782982 | 11/1980 | U.S.S.R. | 29/244 |
| 998081 | 2/1983 | U.S.S.R. | 29/244 |

Primary Examiner—Howard N. Goldberg
Assistant Examiner—John Burtch
Attorney, Agent, or Firm—Wood, Herron & Evans

[57] ABSTRACT

A method and apparatus for applying a hydraulically expandable hub to a shaft by the use of a fixture for mounting the hub square to the end of the shaft as the hub is applied. The fixture comprises a pair of relatively slideable rings, one of which supports the hub as it is applied to the end of the shaft and the other of which slides over a small bearing support end of the shaft and maintains the two rings square relative to the shaft axis as the hub is applied.

11 Claims, 4 Drawing Figures

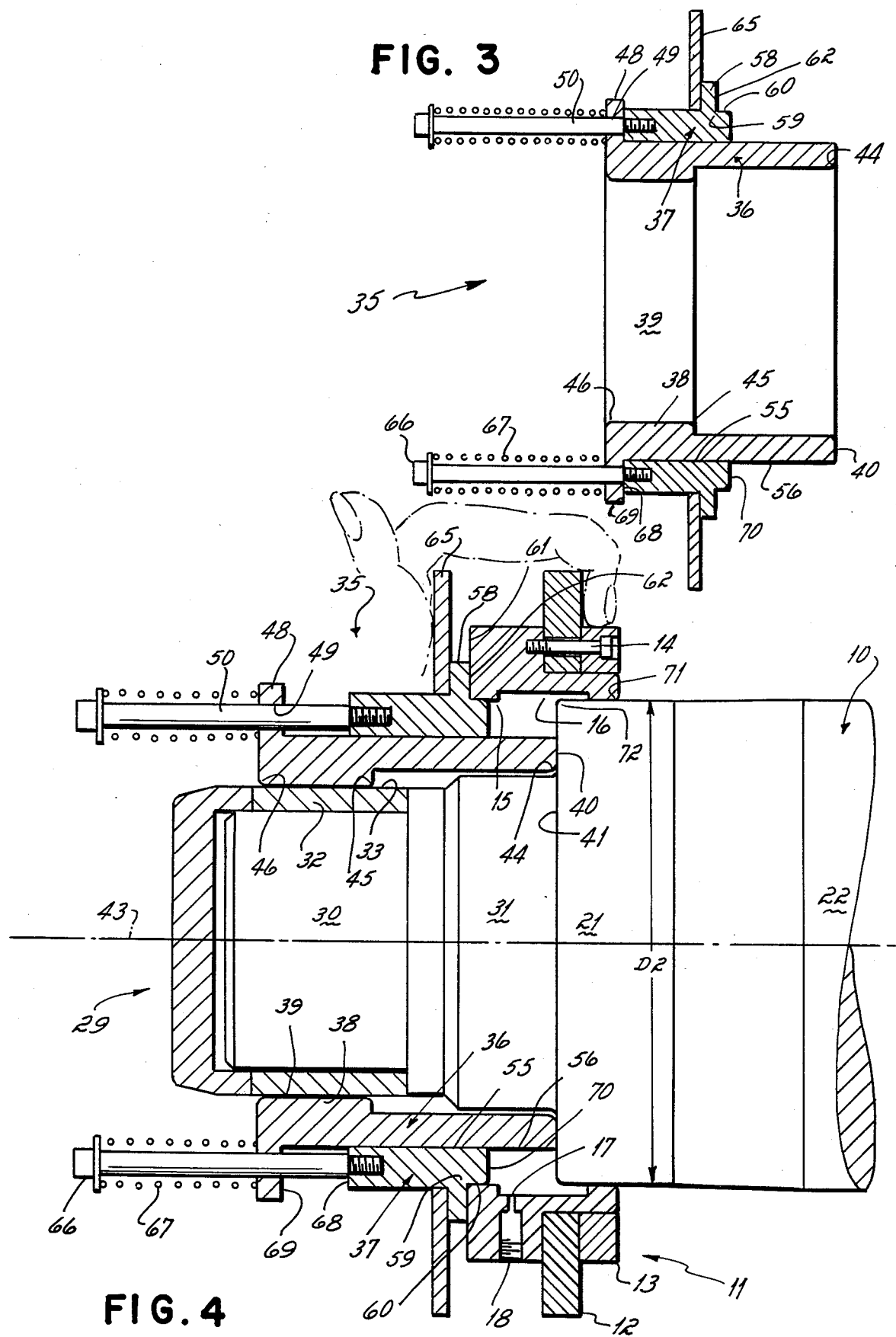

HUB STARTER FIXTURE

This invention relates to hydraulic hubs and more particularly to fixtures for starting hydraulic hubs onto arbors or shafts to which the hubs are to be applied.

Hydraulically expandable hubs or so-called "hydraulic hubs" are now well known to the prior art. Such hubs operate upon the principle of expanding the diameter of the hub by application of hydraulic pressure to the interior of the hub so as to enable the expanded hub to slide over the surface of a shaft. The hydraulic pressure is applied to a chamber defined between a groove in the interior of the hub and the outside diameter of the shaft over which the hub is to slide. Upon removal of the pressure, the hub returns to its original diameter and is thereby frictionally secured to the shaft. This type of hydraulic hub is disclosed in British Pat. No. 1,574,421 wherein the hub has a conventional slitting knife secured thereon.

In order to mount hydraulic hubs of the type disclosed in British Pat. No. 1,574,421 onto a shaft, it is now common practice to provide a small diameter starter end section on the shaft to which the hub is to be applied, which starter end section is slightly smaller in diameter than the internal diameter of the hub. Between the small diameter end section of the shaft and the main or nominal diameter section—which nominal diameter section is slightly larger in diameter than the internal diameter of the hub—there is a tapered section. The difference in diameter between the small diameter starter end section of the shaft and the internal diameter of the hub is usually on the order of 0.001" so that when hydraulic pressure is applied to the hub to expand it, after the hub has been manually placed over the small diameter end section of the shaft, hydraulic fluid will leak from beneath the hub but at an acceptable flow rate. With application of hydraulic pressure to the interior of the hub, the hub expands to a diameter slightly larger than the nominal diameter of the shaft with the result that the hydraulically expanded hub may then be manually pushed over the tapered section of the shaft onto the nominal diameter section. The hub may then be moved and adjusted in position along the shaft and/or angularly rotated relative to it and, when the hydraulic pressure is released, the hub will shrink in diameter and thereby be fixedly secured to the shaft.

I have found that there is a very serious problem in initially placing the hub over the starter end of the shaft when there exists only about one thousandths clearance between the I.D. of the hub and the O.D. of the starter end of the shaft. Quite commonly, the hub becomes skewed or cocked relative to the shaft with the result that a hammer or rubber mallet must be used to work or rock the hub forwardly over the end of the shaft by alternately tapping opposite sides of the hub with the mallet until the hub is forced by the rocking motion of the hub, over the starter end of the shaft. When the internal diameter of the hub is located all the way over the starter end of the shaft, hydraulic pressure may be applied to the hub so as to expand the hub and enable it to be moved over the nominal diameter section of the shaft.

This practice of tapping skewed hubs onto the starter end of a shaft commonly results in the internal diameter of the hub becoming scored and worn. Once a hub has become scored and worn it no longer runs true on the shaft to which it is applied. Quite commonly, slitter knives are mounted by hydraulic hubs onto a shaft and those slitter knives are often specified to have no more than 0.0002" of run-out per revolution of the slitter knife. But, once the hubs have become scored, as a consequence of being tapped into the ends of the shafts in the manner described hereinabove, this run-out may, and quite commonly does, increase to as much as 0.0010".

This scoring of the I.D. of the hubs results from the hubs being softer than the shafts over which the hubs are mounted. This difference in hardness is deliberate because it it far preferable and less expensive to have scored and worn hubs than to have scored and worn shafts. The hubs are much more easily and less expensively replaced than the shafts over which they are mounted.

I have found that most of the scoring and wear which occurs on the I.D. of hydraulic hubs results from the hubs being mounted upon the shafts in a skewed fashion as described hereinabove. Consequently, hubs would need to be replaced much less frequently and in fact would possibly last indefinitely if they could be mounted on the shafts in some manner which eliminated this skewing or cocking and resulting wear. It has therefore been on objective of this invention to provide a method of mounting hydraulically expanded hubs onto a shaft without scoring or wear of the internal diameter of the hubs.

Still another objective of this invention has been to improve the useful life of a hydraulically expandable hub and thereby reduce the tooling costs associated with hydraulically expanded hubs.

Still another objective of this invention has been to eliminate the time consuming and often aggravating practice of having to slowly tap and rock a hydraulically expandable hub onto a shaft so as to initially get it started into the shaft. This time consuming practice not only wears and eventually results in destruction of the hub but also adds to the tooling set-up cost of preparing a machine for operation with the hydraulically expandable hub mounted thereon.

These objectives are achieved, and this invention is predicated upon, the concept of a novel fixture for enabling hydraulically expandable hubs to be mounted upon arbors or shafts without excessive scoring of the hubs or shafts.

I have found that if a hydraulically expandable hub is initially started onto the starter end of a shaft with the face of the hub perpendicular or square to the axis of the shaft, the hub will slide onto the shaft even though the axes of the hub and shaft may not be perfectly concentric when first presented to one another. Accordingly, the new fixture of this invention is predicated upon the concept of maintaining the face of the hub perpendicular to the axis of the shaft while permitting some play between the axis of the hub and the axis of the shaft.

The fixture of this invention which accomplishes these objectives and which enables a hydraulically expandable hub to be mounted onto a shaft without a cocking of the hub on the shaft comprises, an inner ring slideable over a bearing race of a shaft to which the expandable hub is to be applied, and an outer ring slideable over the inner ring. The outer ring has an end shoulder upon which the hydraulic hub is mounted and squared relative to the axis of the outer ring. The inner ring has an end face engageable with the end face of the shaft to which the hub is to be applied so as to square the end face of the center ring with the shaft. The two rings have a very tight sliding "plug" fit (on the order of 0.0005") relative to each other and the outer ring is spring biased outwardly relative to the inner ring so as to initially square the inner ring relative to the shaft. Therefore, when the hub is moved toward the shaft facial engagement of the inner ring with the end face of the shaft maintains the inner ring square relative to the shaft and the mounting of the outer ring relative to the inner ring is such that the outer ring is thereby squared relative to the axis of the shaft. When the fixture is used to mount a hub onto a shaft, the hub is first mounted upon the shoulder of the outer ring, the clearance between the inside diameter (I.D.) of the hub and the outside diameter (O.D.) of the shoulder being about 0.005" so that an easy sliding fit exists between the two. The end face of the hub is then manually pulled into engagement with a face of the shoulder of the outer ring of the fixture by manually squeezing a flange of the hub and a flange of the outer ring. With the fixture and hub so held, the inner ring of the fixture is placed over the bearing race on the end of the shaft and the fixture forced to slide over the bearing race until the end of the inner ring engages the shoulder on the end of the shaft. The clearance between the inner ring and the bearing race is approximately 0.005" so that the inner ring slips easily onto the shaft race until the end of the inner ring engages the end face of the shaft and squares the inner ring relative to the shaft. The outer ring and hydraulic hub are then pushed over the inner ring against the spring bias acting between the two rings. During the sliding of the outer ring of the fixture relative to the inner ring, the shoulder of the inner ring of the arbor is maintained square against the end of the arbor via the effect of the spring bias so as to maintain the fixture, and thus the hub mounted thereon, square relative to the axis of the shaft. The axis of the hub will self-center relative to the axis of the shaft while the fixture, and thus the hub mounted thereon, remain square relative to the axis of the shaft upon which the hub is being mounted. The hub in this attitude slides freely onto the end of the shaft even though there is very little clearance, i.e., on the order of 0.001", between the I.D. of the hub and the O.D. of the starter end of the shaft.

To remove the hub from the shaft, the same relationship is maintained. The fixture is slipped over the race on the end of the shaft until the face on the end of the inner ring engages the face end of the shaft. The outer ring of the fixture is then pushed over the inner ring until the outer ring engages the face on the end of the shaft. The hub is then pulled onto the shoulder of the outer ring of the fixture and squared relative to the outer ring by squeezing the flange of the hub against the flange of the outer ring. The outer ring and hub are then pulled over the inner ring of the fixture while the flange of the hub is squeezed against the flange of the outer ring. The hub thereby is maintained square relative to the shaft as it is removed from the starter end of the shaft.

The primary advantage of this invention is that it enables a hydraulically expandable hub to be easily and quickly mounted over or removed from the starter end of an arbor or shaft relative to which the hub is to be mounted or removed without any scoring or excessive wear of the I.D. of the hub. This fixture also had the advantage of minimizing the operator's skill or dexterity which has heretofore been required to initially start a hydraulically expandable hub into a shaft. Of course, once the hub is started into the shaft and is hydraulically expanded, it slips over the shaft without any potential damage to the interior diameter surface of the hub. As a consequence of the use of this fixture wear or scoring of the I.D. of the hub is virtually eliminated and the useful life of the hub becomes potentially infinite. Thereby, tooling costs to the user of the fixture are substantially reduced.

BRIEF DESCRIPTION OF THE DRAWINGS

These and other objects and advantages of this invention will become more readily apparent from the following description of the drawings in which:

FIG. 3 is a cross sectional view through the hub starter fixture used in the practice of this invention.

FIG. 4 is a cross sectional view of the hub and fixture of FIGS. 2 and 3 illustrating the manner in which the hub is started over the end of the shaft with the assistance of the fixture of FIG. 3, the hub being in an intermediate position prior to mounting and/or removal.

Figures 1, 2:
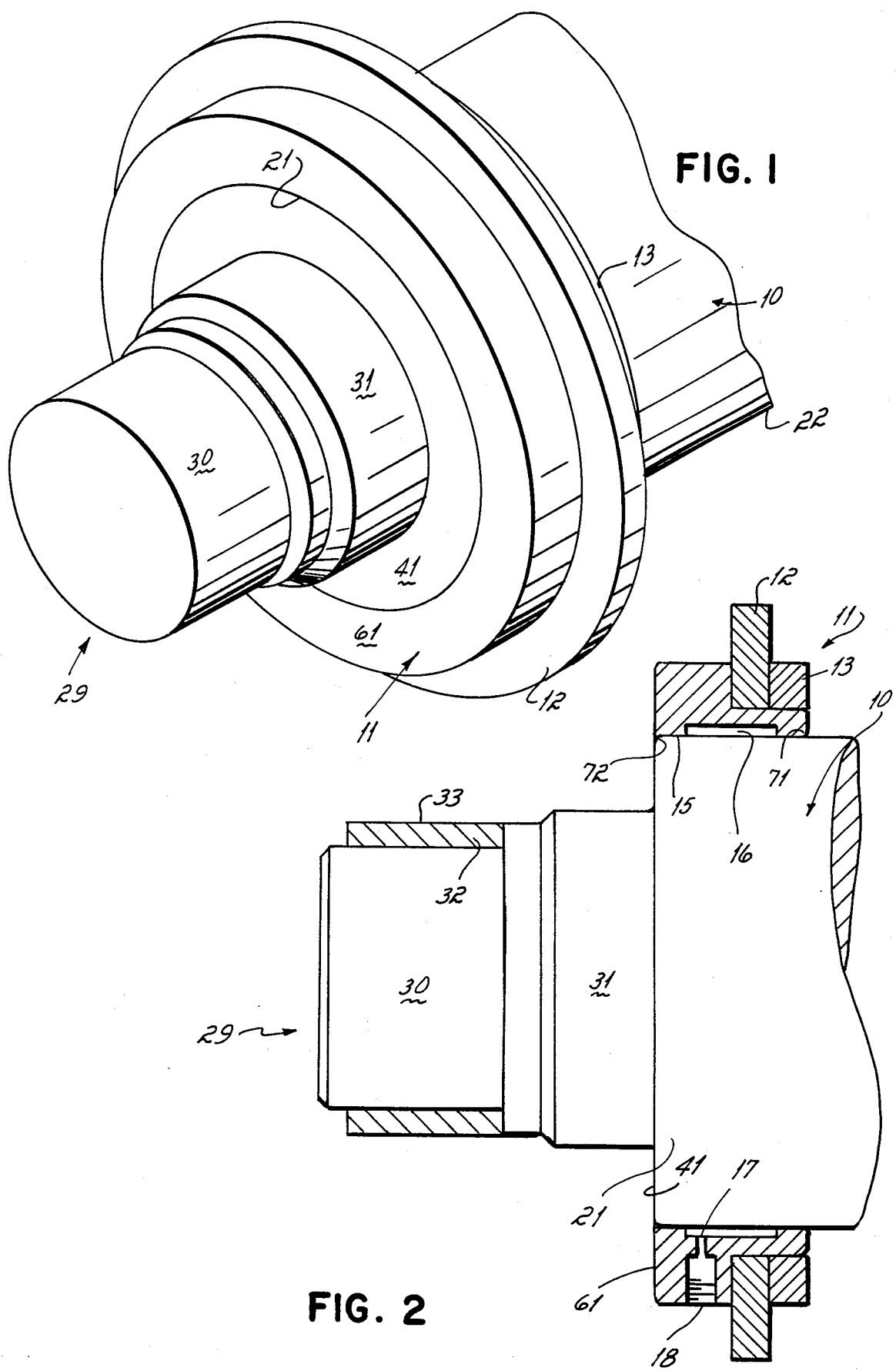
FIG. 1 is a perspective view of a hydraulically expandable hub mounted upon the starter end of a shaft or arbor.
FIG. 2 is a cross sectional view through the arbor and hub of FIG. 1.

Referring first to FIGS. 1 and 2, there is illustrated a shaft on arbor 10 upon which is mounted a conventional hydraulically expandable hub or so-called hydraulic hub 11. In the illustrated embodiment, this hub 11 has a slitter knife 12 mounted thereon and secured thereto by a retaining ring 13 and several bolts 14 (only one of which is shown). The hub 11 has a bore 15 machined therein which is nominally approximately 0.001 inch smaller than the nominal outside diameter of the shaft 10. In order to enable the hub 11 to be positioned over the shaft 10, the inside diameter of the hub is provided with an annular groove 16 which is connected via a passage 17 to a port 18 on the periphery of the hub. This port 18 is adapted to be attached to a source of high pressure fluid, on the order of 4,000 p.s.i., when the hub is mounted on the shaft 10. Upon application of this high pressure fluid to the groove 16, the hub is expanded in diameter relative to the shaft. So long as this pressure is maintained to the port 18, the hub 11 may be moved over the shaft 10. When this pressure is relieved, the hub reduces in diameter and is thereby fixedly secured to the shaft. A more detailed description of the manner in which hydraulic pressure effects expansion of the hub so as to facilitate movement of the hub over the shaft 10 may be found in British Pat. No. 1,574,421.

The shaft 10 is provided with a starter small diameter end section 21 which is slightly smaller in diameter than the diameter of the bore 15 of the hub 11. Generally, the diameter D2 of the starter end of the shaft 10 is approximately 0.001" less than the diameter of the bore 15 so that the hub may be manually placed over the starter end 21 of the shaft preparatory to the application of high pressure fluid to the port 18. If the diameter D2 of the starter end of the shaft is more than 0.001" smaller than the internal diameter of the hub, then excessive fluid leaks between the hub and the end of the shaft when hydraulic pressure is applied to the port 18. And, if the diameter D2 is larger than the 0.001" less than the diameter of the bore 15, it is extremely difficult to manually position the hub over the starter end 21 of the shaft.

Between the small diameter starter end 21 of the shaft and the nominal diameter section 22, the shaft is tapered. This tapered section generally tapers from the starter end section 21 which is approximately 0.001"

smaller than the diameter of the bore 15 to the nominal diameter section 22 which is approximately 0.001" larger than the diameter of the bore 15.

The invention of this application is concerned with a method and a fixture for use in the practice of the method for applying the hub 11 to the starter end 21 of the shaft 10. Because there is such a small clearance between the diameters of the bore 15 and the starter end 21 of the shaft, it is extremely difficult to place the hub over the end of the shaft without causing damage to the bore 15 of the hub 11. In practice, both the hub and the shaft are made of hardened steel, but the shaft is hardened to a greater degree than the hub so that any wear or scoring which occurs between the two, occurs in the hub rather than the shaft.

Prior to this invention, it has been the practice to manually place the hub over the starter end section 21 of the shaft 10. When this is attempted though the hub generally cocks onto the end of the shaft after which a mallet or hammer must be used to alternately tap the hub on opposite sides so as to force it onto the end of the shaft. Similarly, when the hub is removed from the shaft, a mallet or hammer must generally be used to tap opposite sides of the hub so as to rock it off of the end of the shaft. This cocking and then rocking of the hub over the end of the shaft results in excessive wear to the bore 15 of the hub, with the result that it soon becomes scored and must be honed or polished. But, in the process of being honed or polished, the bore often becomes bell-mouthed or tapered and consequently, the hub must be replaced much more frequently than would be the case if this scoring could be avoided. The fixture illustrated in FIGS. 3 and 4 facilitates placement of the hub over the starter end 21 of the shaft without the scoring which has heretofore characterized placement of the hub onto and off of the shaft 10.

Trunions or bearings 29 extend outwardly from opposite ends of the shaft 10. These trunions 29 comprise small diameter end sections 30 connected by a larger diameter shoulder section 31 to the ends of the shaft. In the preferred embodiment illustrated in the drawings, the small diameter end section 30 of the trunion support 29 is encased within a conventional inner-race of a bearing 32. The outer peripheral surface 33 of this race of the bearing serves as a bearing support surface from which the shaft 10 is supported. This surface 33 also functions as a guide surface, as explained more fully hereinafter, for the hub starter fixture 35 which is the subject of this invention.

The hub starter fixture 35 comprises an inner ring 36 and an outer ring 37. The inner ring functions as a locating ring for positioning the fixture relative to the shaft 10 while the outer ring is slideable over the inner ring and functions as a carrier for the hub 11.

The inner ring 36 is generally cylindrical in configuration and has an inwardly extending flange 38 at its outer end. This inwardly extending flange 38 has a machined axial bore 39 sized so as to be slightly larger in diameter than the outside diameter of the peripheral surface 33 of the bearing race 32. Generally, a clearance on the order of 0.005" is maintained between the outside diameter of the race 32 and the inside diameter of the bore 39 so that the inner ring 36 can be easily slipped over the race 32.

At its inner end, the inner ring 36 is provided with an accurately machined planar face 40 which is perpendicular to the axis of the bore 39. This planar face 40 is engageable with the accurately machined face 41 of the shaft 10 so as to accurately locate the ring 36 parallel with the axis 43 of the shaft 10. As may be most clearly seen in FIG. 3, the inner corners 44, 45 and 46 of the ring are radiused so as to facilitate slipping of the inner ring onto and over the trunion support end of the shaft 10. Because the bore 39 of the inner ring is larger and has a clearance on the order of 0.005" between the bore and the outside diameter of the race 32, the axis of the ring 36 may not be exactly concentric with the axis 43 of the shaft 10, but the placement and maintenance of the end face 40 of the ring in engagement with the end face 41 of the shaft 10 insures that the axis of the inner ring is always square or perpendicular to the end face 41 of the shaft and that the axis of the ring is thereby always parallel to the axis 43 of the shaft 10.

At its outer end the inner ring 36 has a radial flange 48 extending outwardly therefrom. This flange 48 is provided with a plurality of equidistantly spaced guide holes 49 adapted to receive and guide rods 50 which are threaded into the outer ring 37 and pass through the guide holes 49.

The outer ring 37 is also generally cylindrical in configuration. It has an axial bore 55 which is accurately machined so as to define a "plug" fit with the exterior peripheral surface 56 of the inner ring. Generally, the clearance between the two surfaces 55, 56 is on the order of 0.0005" so that the outer ring is slideable over the inner ring but without any looseness or play between the two.

On its inner end, the outer ring is provided with a radially extending flange 58 which defines a shoulder 59 on the inner end of the outer ring 37. This shoulder 59 functions as a seat for the hub 11. The outside diameter 60 of the shoulder 59 is sized so as to be approximately 0.005" smaller in diameter than the inside diameter of the bore 15 of the hub so that the hub may be easily slipped over the end of the ring 37 until the outer face 61 of the hub engages the inner face 62 of the shoulder 59. Positioning of the face 61 of the hub against the accurately machined face 62 of the shoulder 59 of the outer ring 37 squares the face 61 of the hub relative to the axis of the outer ring 37 and thereby relative to the axis 43 of the shaft 10. In order to enable the face 61 of the hub to be maintained flush with the face 62 of the shoulder 59, the outer ring is provided with an annular flange 65 in the form of a ring welded or otherwise fixed to the outer face of the flange 58. By manually squeezing the slitter knife 12 attached to the hub 11, and the flange 65, it is possible to pull the hub against the surface 62 of the shoulder and thereby maintain the face 61 of the hub tightly against the face 62 of the shoulder. In practice, this is the manner in which the hub is maintained seated on the shoulder 59 of the outer ring 37.

As mentioned hereinabove, guide rods 50 extend outwardly from the outer ring 37 and through the guide holes 49 in the flange 48 of the inner ring. These guide rods have an enlarged head 66 on their outer ends and a compression spring 67 located between the end 66 and the outer face of the flange 48. These springs 67 bias the outer ring outwardly to a position in which the outer face 68 of the outer ring 37 engages the inner face 69 of the flange 48 of the inner ring.

The key to placement of the hub 11 over the starter end section 21 of the shaft 10 is to maintain the end face of the hub square relative to the axis of the shaft 10. If the end face of the hub is square relative to the axis of the shaft, then the axis of the hub will be parallel to the axis of the shaft 10, and the hub may be slipped over the end section 21 of the shaft without any cocking and resulting marring or scoring of the bore of the hub 11. On the other hand, if the end face of the hub is not squared relative to the axis of the hub, then the hub will cock or become angled relative to the axis of the shaft and thereby will be prevented from sliding over the end of the shaft without substantial scoring and marring of the bore of the hub.

In order to use the fixture 35 to position the hub over the end 21 of the shaft 10, the hub 11 is initially seated onto the shoulder 59 of the outer ring of the fixture. The person who is to place the hub on the shaft, then manually squeezes the knife 12 and the flange 65 of the fixture as illustrated in FIG. 4 so as to seat the face 61 of the hub firmly against the face 62 of the shoulder 59 of the outer ring 37. With the fixture and hub seated thereon and so held, the fixture is slipped over the trunion end of the shaft until the bore 39 of the inner ring slips over the outside diametral surface 33 of the race 32. While the fixture continues to be so held and the slitter knife squeezed toward the flange 65, the fixture is moved over the race 32 until the end face 40 of the inner ring engages the face 41 of the shaft 10, thereby squaring the surface 40 of the inner ring relative to the axis 43 of the shaft 10. This is the position of the fixture and hub illustrated in FIG. 3. Because there is relatively substantial clearance between the bore 15 of the hub and the peripheral surface 60 of the shoulder 59, and between the bore 39 of the inner ring and the peripheral surface 33 of the race, the axis of the hub may not be concentric with the axis 43 of the shaft, but the axis of the hub will be parallel to the axis of the shaft because of the planar face 61 of the hub being very nearly perfectly square to the axis of the fixture and thus to the axis of the shaft. With the fixture then located in the position illustrated in FIG. 3. and while the slitter knife 12 is being squeezed toward the flange 65 of the outer ring, the outer ring is pushed inwardly against the bias of the springs so as to transport the outer ring and the hub mounted thereon inwardly over the starter end section 21 of the shaft. Even though the axis of the hub may be slightly offset from the axis of the shaft 43, the radius 71 of the hub will guide the hub over the radiused end 72 of the shaft 10. Thereby, the face 61 of the hub is maintained square to the axis of the shaft 10 and is prevented from cocking or becoming angled relative to the axis of the shaft.

After the hub 11 has been positioned onto and over the starter end 21 of the shaft 22, the fixture 35 is removed from the end of the shaft, thereby leaving the hub 11 on the shaft 10 in the position illustrated in FIGS. 1 and 2. Hydraulic fluid at high pressure may then be introduced into the port 18 so as to expand the diameter of the hub 11 and enable the hub to be moved over the tapered section of the shaft and onto the nominal diameter section 22. When the hub has been correctly positioned on the nominal diameter section 22 of the shaft, the hydraulic pressure is released from the port 18 so that the hub shrinks in diameter and is thereby fixedly secured to the shaft 10.

When it is desired to remove the hub from the shaft, the fixture 35 is again brought into play. The hub 11 is first moved to the starter end 21 of the shaft by applying hydraulic pressure to the port 18 so as to expand the hub and enable it to be moved to the position illustrated in FIG. 2. Hydraulic pressure is then disconnected from the port 18. The hub may then be manually removed from the starter end section 21 of the shaft, but it is difficult to do so without the hub becoming cocked and requiring the use of a hammer to tap it on opposite sides so as to force it off of the end of the shaft. However, if the fixture 35 is used to remove the hub, the hub will remain square relative to the axis of the shaft so that it may be removed therefrom without cocking. To that end, the fixture is again placed over the race 32 and the end face 40 of the inner ring of the fixture is placed in abutment against the face 41 of the shaft. The outer ring is then pushed by application of pressure against the flange 65 until the end face 70 of the outer ring engages the face 41 of the shaft 10. The hub 11 is then slid onto the shoulder 59 by squeezing the slitter knife 12 toward the flange 65. With the hub 11 seated on the shoulder 59 and while continuing to squeeze the slitter knife toward the flange 65, the fixture and hub are pulled off of the end of the shaft, the fixture functioning to maintain the end face 61 of the hub perpendicular or square to the axis of the outer ring and thereby relative to the axis of the shaft 43. In this manner the fixture functions to assist in removing the hub from the shaft, and in preventing the hub from becoming cocked relative to the shaft as it is pulled therefrom.

While I have described my invention as being useful for applying hydraulic hub mounted slitter knives to shafts, it will be appreciated that this fixture and the method of utilizing the fixture may also be used for applying any hydraulically expandable hub to a shaft irrespective of the type of tool mounted upon the hub. Therefore, I do not intend to be limited except by the scope of the following appended claims.

I claim:

1. A method of applying a hydraulically expandable hub onto the end section of a shaft when there is a very small clearance between the inside diameter of the hub and the outside diameter of the end section of the shaft, which shaft has a small diameter bearing surface on the end thereof and a shoulder between said bearing surface and said end section of said shaft, which method comprises utilizing a fixture to position said hub relative to the axis of said shaft, said fixture having an inner ring and an outer ring slideable over said inner ring,
said inner ring having a shoulder thereon,
seating the hub onto the shoulder of the outer ring of the fixture,
sliding said inner ring of said fixture onto the bearing surface on the end of said shaft until an end face of said inner ring engages an end face of said shoulder of said shaft and thereby squares said inner ring relative to the axis of said shaft,
squeezing said hub and said outer ring so as to locate an end face of said hub against a face of said shoulder of said outer ring to thereby square said hub relative to the axis of said outer ring,
sliding said outer ring and hub over said inner ring while continuing to squeeze said hub against said face of said shoulder of said outer ring and while maintaining said end of said inner ring against the face of said shoulder of said shaft until the inside diameter of said hub is positioned over the outside diameter of said end section of said shaft.

2. A method of removing a hydraulically expandable hub from the end section of a shaft when there is a very small clearance between the inside diameter of the hub and the outside diameter of the end section of the shaft, which shaft has a small diameter bearing surface on the end thereof and a shoulder between said bearing surface and said end sections of said shaft, which method comprises utilizing a fixture to position said hub relative to the axis of said shaft, said fixture having an inner ring and an outer ring slideable over said inner ring, said inner ring having a shoulder thereon, sliding said inner ring of said fixture onto the bearing surface on the end of said shaft until an end face of said inner ring engages an end face of said shoulder of said shaft and thereby squares said inner ring relative to the axis of said shaft, seating the hub onto the shoulder of the outer ring of the fixture, squeezing said hub and said outer ring so as to locate an end face of said hub against a face of said shoulder of said outer ring to thereby square said hub relative to the axis of said outer ring, sliding said outer ring and hub over said inner ring while continuing to squeeze said hub against said face of said shoulder of said outer ring and while maintaining said end of said inner ring against the face of said shoulder of said shaft until the inside diameter of said hub is removed from the outside diameter of said end section of said shaft.

3. A fixture for use in mounting a hydraulically expandable hub onto the end section of a shaft when there exists a very small clearance between the inside diameter of the hub and the outside diameter of the end section of the shaft, which shaft has a small diameter bearing surface on the end thereof and a shoulder between said bearing surface and said end section of said shaft, which fixture comprises, an inner ring and an outer ring, said outer ring having a hub receiving shoulder at one end thereof, said hub receiving shoulder having a diametral section smaller in diameter than the inside diameter of said hub and a hub engageable face accurately square to the axis of said outer ring, said outer ring having an accurately machined inside diameter surface slideable over an accurately machined outside diameter surface of said inner ring, said inner ring having an end surface perpendicular to the axis of said inner ring, said end surface being adapted to be engaged with a face of said shoulder of said shaft so as to square said inner ring relative to the axis of said shaft and thereby square a hub mounted upon said outer ring relative to the axis of said shaft, and said inner ring having an inside diameter surface adapted to be seated over the small diameter bearing surface of said shaft so as to initially position a hub mounted upon said outer ring relative to the axis of said shaft.

4. The fixture of claim 3 which further comprises a guide means operable between said inner and outer rings, said guide means being operable to assist in maintaining the axis of said outer ring concentric relative to the axis of said inner ring as said outer ring slides over said inner ring.

5. The fixture of claim 4 wherein said guide means comprises at least two guide rods secured to said outer ring, said guide rods extending parallel to the axis of said outer ring, and a flange on said inner ring, said guide rods of said outer ring extending through guide holes in said flange of said inner ring.

6. The fixture of claim 5 wherein said guide rods each have a first end secured to said outer ring and a second end remote from said outer ring, said second end having a head thereon, and spring means operable between each of said heads of said guide rods and said flange of said inner ring to bias the end of said outer ring remote from said one end against said flange.

7. The fixture of claim 6 wherein said spring means comprises compression springs surrounding each of said guide rods between said heads and said flange of said inner ring.

8. A fixture for use in mounting a hydraulically expandable hub onto the end section of a shaft where there exists a small clearance between the inside diameter of the hub and the outside diameter of the end section of the shaft, which fixture comprises, an inner ring having an inside bore adapted to be received over a bearing surface on the end of the shaft, said inner ring having an accurately machined outer peripheral surface extending parallel to said bore, said inner ring having an accurately machined end surface at one end of said inner ring, said end surface of said inner ring being perpendicular to said outer peripheral surface, and said inner ring having an outwardly extending radial flange at the end opposite from said one end, and guide holes in said flange, an outer ring, said outer ring having an accurately machined inside bore surface slideable over the outer peripheral surface of said inner ring, a shoulder formed on one end of said outer ring, said shoulder being adapted to receive said hub thereon, said outer ring having a second end remote from said one end of said outer ring, and guide rods extending from said second end of said outer ring, said guide rods being parallel to the axis of said bore surface of said outer ring and extending through said guide holes in said flange of said inner ring.

9. The fixture of claim 8 wherein said guide rods each have a first end secured to said outer ring and a second end remote from said outer ring, said second end having a head thereon, and spring means operable between each of said heads of said guide rods and said flange of said inner ring to bias the end of said outer ring remote from said one end against said flange.

10. The fixture of claim 9 wherein said spring means comprises compression springs surrounding each of said guide rods and located between said heads and said flange of said outer ring.

11. The fixture of claim 8 which further comprises a flange extending radially from said outer ring, said flange being located between said shoulder and said second end of said outer ring.

* * * * *